July 17, 1956

R. K. SHEWMON 2,754,579

METHOD OF MAKING A MOTOR END FRAME

Filed April 21, 1953

INVENTOR.
RALPH K. SHEWMON

BY

ATTORNEYS

July 17, 1956  R. K. SHEWMON  2,754,579
METHOD OF MAKING A MOTOR END FRAME
Filed April 21, 1953  2 Sheets-Sheet 2
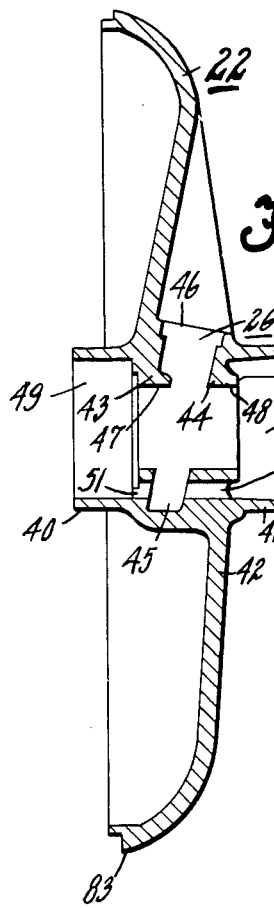
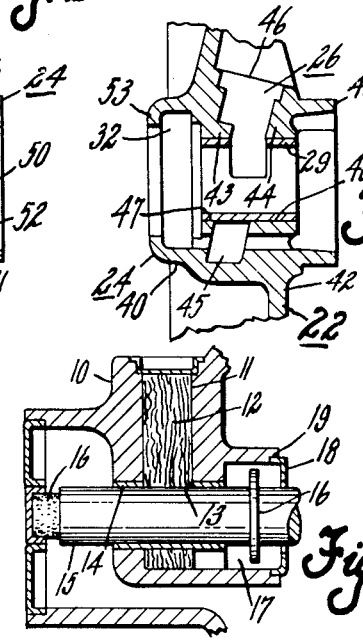
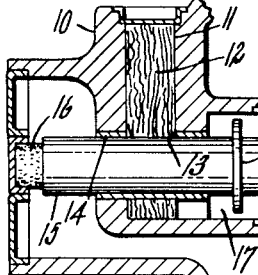
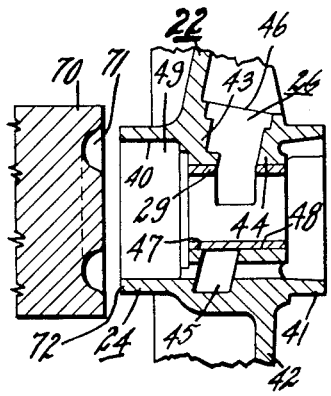
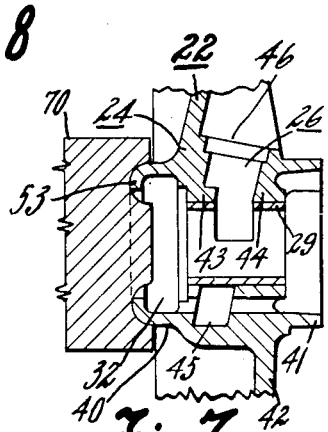
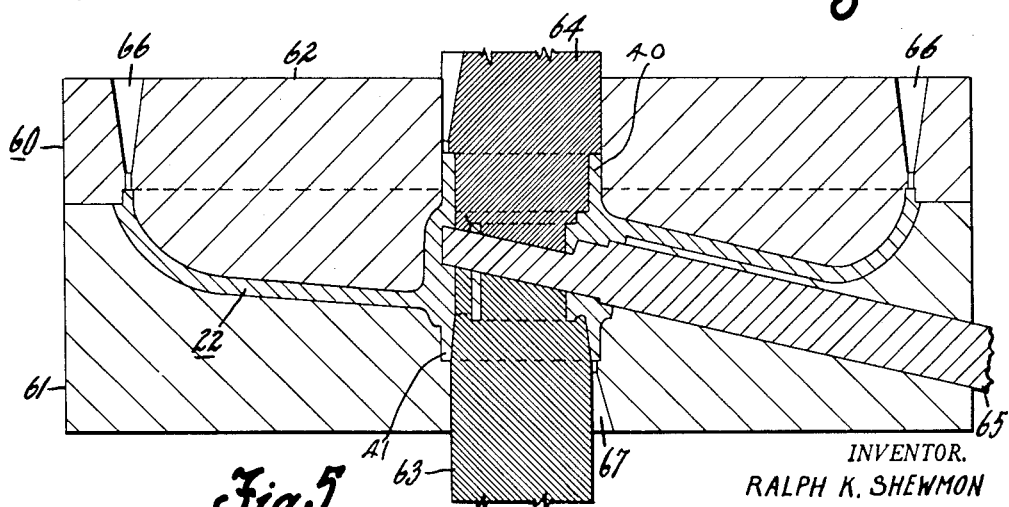
INVENTOR.
RALPH K. SHEWMON
BY
ATTORNEYS

United States Patent Office 2,754,579
Patented July 17, 1956

2,754,579

METHOD OF MAKING A MOTOR END FRAME

Ralph K. Shewmon, Dayton, Ohio, assignor to General Motors Corporation, Detroit, Mich., a corporation of Delaware Application April 21, 1953, Serial No. 350,187

4 Claims. (Cl. 29—528)

This invention relates to electric motors and particularly to the method of making an end frame for an electric motor.

In the manufacture of electric motors, it is essential to provide for lubrication of the shaft bearings. However, the lubrication of shaft bearings in electric motors has presented a problem of providing satisfactory means to eliminate lubricant spreading to the interior of the electric motor. This is a particularly acute problem in electric motors of the capacitor type utilizing electric switches in the motor for connecting starting and running windings of the motor to the power source.

It is conventional, in electric motors, to provide an oil flinging cavity adjacent the motor bearing, and around the motor shaft, in which an oil flinger is positioned, as carried by the motor shaft, to centrifugally discharge oil travelling along the shaft from the motor bearing into the oil flinging cavity for return to the lubricant reservoir. Conventionallly, the electric motor end frame carrying the shaft bearing is a casting usually made in a sand mold. However, die-casting in permanent mold is also used, especially when the end frame is made of aluminum. In this instance, the shape of the oil flinging cavity has presented a production problem since it has been necessary to provide a radially extending flange on the outer extremity of the cavity to form a wall which prevents flow of oil collected in the cavity from draining into the motor housing. In those end frames made by die-casting in permanent molds, it has been necessary to provide a sheet metal insert as one wall of the oil flinging cavity. This has necessitated extremely close machining tolerances in attempting to reduce the leakage at the joint between the sheet metal insert and the die-cast end frame, and the use of various sealing compounds and sealing varnishes.

Also, since it is desirable to have the shaft bearing of the electric motor mounted within a lubricant chamber, to provide for long-time lubrication of the bearing, difficulty has been encountered in providing for rigid mounting of the bearing.

It is therefore an object of this invention to provide an oil retaining cavity or lubricant reservoir around the shaft bearing of an electric motor that is an integral cast part of a die-cast end frame for the motor.

It is also an object of the invention to provide a die-cast electric motor end frame provided with a lubricant reservoir and a wall forming an oil flinging cavity adjacent the reservoir wherein the wall forming the oil flinging cavity is a unitary part of the cast end frame for the electric motor.

It is another object of the invention to provide a die cast end frame for an electric motor having a combined lubricant reservoir and bearing support wherein the bearing support comprises solid wall members integral with the end frame casting to obtain maximum rigidity for mounting of the shaft sleeve-bearing.

It is another object of the invention to provide a method for manufacturing a die cast electric motor end frame, particularly of aluminum or aluminum alloy, having an oil retaining cavity around a bearing and an oil flinging cavity adjacent the oil retaining cavity with the cast wall forming the oil flinging cavity formed with an integral radially extending flange obtained by swaging the end periphery of the cast wall forming the oil flinging chamber.

Further objects and advantages of the present invention will be apparent from the following description, reference being had to the accompanying drawings wherein a preferred embodiment of the present invention is clearly shown.

In the drawings:

Figure 4 is a transverse cross-sectional view of an electric motor end frame incorporating features of this invention illustrating the cast structure prior to finish forming of the oil flinging chamber;

Figure 5 is a transverse cross-sectional view of a mold in which the cast motor end frame of Figure 4 is formed;

Figure 6 is a cross-sectional view of the shaft bearing support and lubricant well structure together with a forming die for finish forming of the oil flinging chamber;

Figure 7 is a transverse cross-sectional view similar to Figure 6 but illustrating the finish forming of the oil flinging chamber;

Figure 8 is a transverse cross-sectional view of the motor bearing support and oil reservoir structure subsequent to the forming of the oil flinging chamber adjacent the bearing support;

Figure 9 is a transverse cross-sectional view of a bearing support in an electric motor end frame constructed in accordance with the prior art.

Figure 1:
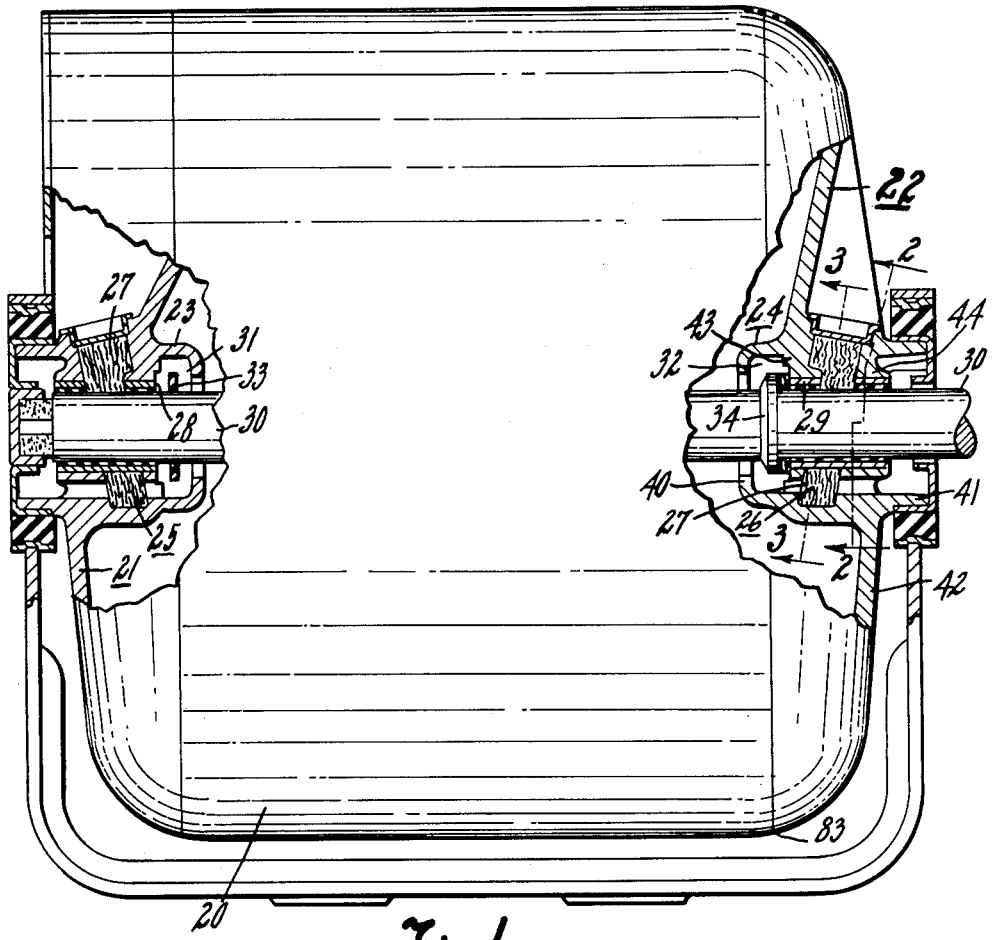
Figure 1 is an elevational view of an electric motor having end portions thereof broken away to illustrate the bearing mounting features of this invention.
Figure 2:
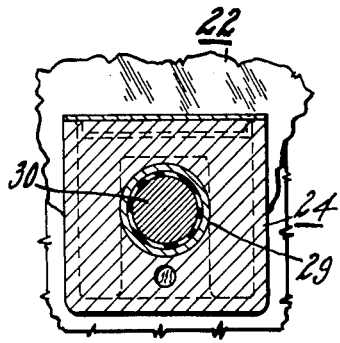
Figure 2 is a cross-sectional view taken along line 2—2 of Figure 1.
Figure 3:
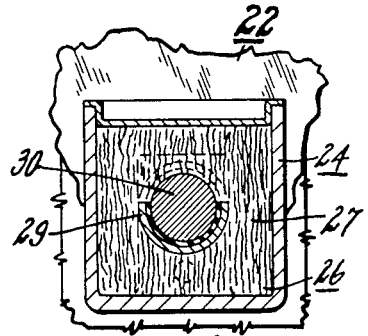
Figure 3 is a cross-sectional view taken along line 3—3 of Figure 1.

In Figure 9 there is illustrated a cast motor support and lubricant reservoir constructed according to prior practices. In the casting of electric motor end frame structures by permanent mold die-casting processes, it is essential that all surfaces parallel with the axis of the motor shaft be coaxial with the axis of the shaft bearing openings to permit removal of the cast end frame from a mold.

In Figure 9, there is illustrated a conventional die-cast electric motor end frame 10 having a cavity 11 adapted to be filled with a wicking material 12. The wicking material 12 receives lubricant that passes through an opening 13 provided in the bearing sleeve 14 mounted in the end frame casting 10.

The bearing sleeve 14 carries a motor shaft 15 that engages a thrust bearing 16 at one end thereof. The shaft 15 carries an oil flinging ring 16 that is positioned in an oil flinging chamber 17 positioned at one end of the bearing sleeve 14.

The oil flinging chamber 17, according to prior practice, is partially closed at the open end thereof by an annular ring 18 that is pressed into a closely machined groove 19. However, oil seeps along the line of the groove 19 and finally enters the interior of the electric motor, collecting on switch mechanisms therein, and generally causing trouble interiorly of the motor.

In this invention, this seepage of oil into the interior of an electric motor from the oil flinging chamber is eliminated.

In this invention, the electric motor 20 is provided with die-cast end frames 21 and 22, respectively. Each of the end frames 21 and 22 has as an integral part thereof a bearing support structure 23 and 24, respectively. Each of the bearing support structures 23 and 24 includes a closed chamber 25 and 26, respectively, adapted to receive wicking material 27 that contains oil for lubricating the shaft bearing. The bearing structures 23 and 24 support shaft bearings 28 and 29, respectively, that carry the electric motor shaft 30.

Adjacent one end of the bearings 28 and 29, there is provided the oil flinging chambers 31 and 32, respectively, into which oil seeping along the motor shaft 30 is centrifugally discharged for return to the lubricant chambers 25 and 26, respectively. The motor shaft 30 carries the oil flinger 33 adjacent bearing 28 for the aforesaid purpose, and the enlargement 34 on the shaft 30 adjacent the bearing 29 serves the same purpose. Since all of the lubricant reservoirs and bearing supports for the electric motor are substantially identical in structure, only one of them will be hereinafter described.

Referring now to the lubricant reservoir and bearing structure 24, see Fig. 1, the motor end frame 22 has the cylindrical annular walls 40 and 41 extending from opposite sides of the end wall portion 42 of the end frame 22. The end wall portion 42 of the frame 22 terminates in a side wall portion 83.

Extending transversely of the annular wall portions 40 and 41 are the solid wall portions 43 and 44 that are disposed substantially parallel to one another and provide a solid structure extending transversely across the opening formed by the annular wall portions 40 and 41. These spaced solid wall portions 43 and 44 form a closed chamber 45 that is adapted to be filled with the wicking material heretofore referred to. The closed chamber 45 extends transversely of the annularly arranged wall portions 40 and 41. The annular wall formed by the wall portions 40 and 41 has an opening 46 aligned with the chamber 45 through which the wicking material is inserted into the chamber 45.

The walls 43 and 44 have openings 47 and 48, respectively, that are coaxially aligned relative to each other and are adapted to receive the motor shaft 30 as supported in the sleeve bearing 29 pressed into the openings 47 and 48.

The annular walls 40 and 41 provide cup-shaped openings 49 and 50 at opposite ends of the bearing 29, the bottoms of the cup-shaped openings 49 and 50 being formed by the walls 43 and 44, respectively.

Passages 51 and 52 are provided in the walls 43 and 44, respectively, at the lowermost extremities of the openings 49 and 50 whereby lubricant passing into the cup-shaped openings will be returned into the lubricant chamber 45.

The annular wall 40 has an inwardly directed radial flange 53 formed as an integral part of the cast wall 40 and forming therewith a recess creating the oil flinging chamber 32. With the radial flange 53 integral with the wall 40, there can be no seepage of oil into the interior of the electric motor.

To form the radial flange 53 as an integral part of the cast wall 40, the electric motor end frame 22 is cast in the form as illustrated in Fig. 4.

A permanent mold, as illustrated in Fig. 5, is provided for casting the motor end frame illustrated in Fig. 4. The mold 60 comprises a mold section 61 that cooperates with a mold section 62 whereby to form a mold cavity therebetween conforming to the contour of the cast motor end frame, as illustrated in Fig. 4, and as illustrated as contained between the mold sections 61 and 62.

The mold section 61 carries a removable insert 63 that forms the cup-shaped cavity 50 and the bearing sleeve opening 48. A removable mold insert 64 carried by the mold section 62 forms the cavity 49 and the bearing sleeve opening 47.

Cooperating with the mold inserts 63 and 64 is a removable mold insert 65 that forms the walls 43 and 44 of the motor end frame casting and provides the lubricant chamber 45.

The mold section 60 is provided with inlet passages 66 through which molten metal is delivered into the mold cavity, and suitable vents 67 may be provided for venting the mold cavity. To provide for withdrawal of the mold inserts 63 and 64, it is essential that the wall portions 40 and 41 of the die-cast end frame be cylindrical in shape.

Upon removal from the mold, the motor end frame 22 has the cross sectional contour illustrated in Fig. 4. At this time, the oil flinging chamber 32 has not been completely formed, that is, the radially flanged portion 53 is an integral annular portion of the wall 40, as illustrated in Fig. 6.

With the end frames 21 and 22 made of aluminum or an aluminum alloy, the flanged portion 53 is formed integral with the wall 40. This is accomplished by a friction block 70 having the semi-cylindrical shaped recess 71 therein pressure urged against the end periphery 72 of the wall 40. This pressure frictional engagement between the hardened friction block 70 and the end periphery 72 of the wall 40 causes the entire periphery of the wall 40 to heat simultaneously. Sufficient friction is created between the friction block 70 and the end periphery 72 to soften the cast aluminum or aluminum alloy metal in the wall 40 so that continued axial pressure applied to the friction block 70 will cause it to move toward the end frame section 22, resulting in a forming of the flanged wall 53, as illustrated in Fig. 7. The metal in the periphery of the wall 40 is raised substantially to softening temperature whereby the forming of the flange 53 results from the swaging action produced between the friction block 70 and the periphery 72 of the wall 40.

While the embodiment of the present invention as herein disclosed, constitutes a preferred form, it is to be understood that other forms might be adopted.

What is claimed is as follows:

1. A method for casting and forming a one piece electric motor end frame structure having a complex wall configuration that includes an end wall portion provided with walls forming a combined lubricant well and shaft bearing support projecting from the end wall portion with the lubricant well including wall means defining an oil flinging chamber disposed at one side of the lubricant well and around the bearing support with the said wall means including an annular wall portion provided with a radial flange formed integral therewith extending inwardly toward the axis of the bearing support, the steps comprising, pressure casting in a permanent mold form an electric motor frame of an aluminum alloy with an end wall having an annularly extending straight wall portion projecting from one side thereof, elevating the temperature of the entire end periphery of the said annular wall to flow temperature of the metal under concurrently applied axially directed pressure to effect radially directed flow of the metal of the said annular wall to form a structurally intimate radially extending flange on the said annular wall.

2. A method for casting and forming a one piece electric motor end frame structure having a complex wall configuration that includes an end wall portion provided with walls forming a combined lubricant well and shaft bearing support projecting from the end wall portion with the lubricant well including wall means defining an oil flinging chamber disposed at one side of the lubricant well and around the bearing support with the said wall means including an annular wall portion provided with a radial flange formed integral therewith extending inwardly toward the axis of the bearing support, the steps comprising, pressure casting in a permanent mold form an electric motor frame of an aluminum alloy with an end wall having an annularly extending straight wall portion projecting from one side thereof, elevating the temperature of the entire end periphery of the said annular wall to flow temperature of the metal by frictional heating means while simultaneously applying axially directed pressure to the said annular wall by means of the frictional heating means to concurrently heat and pressure form the entire end periphery of the said annular wall under the temperature conditions attained at the pressure value applied to effect radially directed flow of the metal of the end periphery of the annular wall to form thereby a structurally intimate radially extending flange on the said annular wall.

3. A method for casting and forming a one piece electric motor end frame structure having a complex wall configuration that includes an end wall portion provided with walls forming a combined lubricant well and shaft bearing support projecting from the end wall portion with the lubricant well including wall means defining an oil flinging chamber disposed at one side of the lubricant well and around the bearing support with the said wall means including an annular wall portion provided with a radial flange formed integral therewith extending inwardly toward the axis of the bearing support, the steps comprising, pressure casting in a permanent mold form an electric motor frame of an aluminum alloy with an end wall having an annularly extending straight wall portion projecting from one side thereof, frictionally heating the entire end periphery of the annular wall by pressure rubbing of a friction block against the end periphery of the said annular wall until the heating of the end periphery under the effect of the pressure rubbing causes softening of the metal sufficient for flow of the metal under the friction pressure causing the heating to effect shaping of the said end wall to the contour shape of the rubbing surface of the friction block engaging the periphery of the annular wall.

4. A method for casting and forming a one piece electric motor end frame structure having a complex wall configuration that includes an end wall portion provided with walls forming a combined lubricant well and shaft bearing support projecting from the end wall portion with the lubricant well including wall means defining an oil flinging chamber disposed at one side of the lubricant well and around the bearing support with the said wall means including an annular wall portion provided with a radial flange formed integral therewith extending inwardly toward the axis of the bearing support, the steps comprising, pressure casting between separable cooperating permanent mold die forms having withdrawable mold inserts cooperating with the die forms to provide hollow chambers in an electric motor end frame of an aluminum alloy with an end wall portion having an annularly extending straight wall formed between a die form and a withdrawable insert with the insert effecting a cavity defined by the annularly extending wall and withdrawable from within the defining annular wall after the wall is cast, removing the withdrawable inserts and the die forms from the pressure cast electric motor end frame, elevating the temperature of the entire end periphery of the said annular wall frictionally by pressure engagement of a friction block against the end periphery of the annular wall with simultaneous movement effecting frictional heating until heating the end periphery only of the annular wall until the temperature rise of the said end periphery is sufficient for flow of the metal under the friction pressure applied by the friction block to effect contoured shaping of the so heated end periphery to the contoured shape of the friction surface of the friction block engaging the heated end periphery of the annular wall.

References Cited in the file of this patent

UNITED STATES PATENTS

| Number | Name | Date |
|---|---|---|
| 1,185,366 | Burke | May 30, 1916 |
| 1,440,549 | Parkhurst | Jan. 2, 1923 |
| 1,669,938 | Johnson | May 15, 1928 |
| 1,996,181 | Wait | Apr. 2, 1935 |
| 2,057,207 | Rowe et al. | Oct. 13, 1936 |
| 2,266,968 | Hamilton | Dec. 23, 1941 |
| 2,273,931 | Byrnes | Feb. 24, 1942 |